US008195923B2

(12) United States Patent
Spracklen et al.

(10) Patent No.: US 8,195,923 B2
(45) Date of Patent: Jun. 5, 2012

(54) METHODS AND MECHANISMS TO SUPPORT MULTIPLE FEATURES FOR A NUMBER OF OPCODES

(75) Inventors: Lawrence A. Spracklen, Boulder Creek, CA (US); Gregory F. Grohoski, Bee Cave, TX (US); Christopher H. Olson, Austin, TX (US); Robert T. Golla, Round Rock, TX (US)

(73) Assignee: Oracle America, Inc., Redwood City, CA (US)

( * ) Notice: Subject to any disclaimer, the term of this patent is extended or adjusted under 35 U.S.C. 154(b) by 546 days.

(21) Appl. No.: 12/420,054

(22) Filed: Apr. 7, 2009

(65) Prior Publication Data

US 2010/0257338 A1  Oct. 7, 2010

(51) Int. Cl.
*G06F 9/30* (2006.01)
(52) U.S. Cl. ......................... 712/209; 712/208
(58) Field of Classification Search ................... 712/208, 712/209
See application file for complete search history.

(56) References Cited

U.S. PATENT DOCUMENTS

| 5,349,681 | A | * | 9/1994 | Yoshida et al. | 712/227 |
| 5,386,580 | A | * | 1/1995 | Yoshida et al. | 712/32 |
| 5,390,307 | A | * | 2/1995 | Yoshida | 712/225 |
| 5,396,610 | A | * | 3/1995 | Yoshida et al. | 711/150 |
| 5,519,881 | A | * | 5/1996 | Yoshida et al. | 712/208 |
| 5,542,060 | A | * | 7/1996 | Yoshida | 712/208 |
| 5,638,525 | A | * | 6/1997 | Hammond et al. | 712/209 |
| 5,870,596 | A | * | 2/1999 | Yoshida | 712/225 |
| 6,041,403 | A | | 3/2000 | Parker et al. | |
| 6,134,653 | A | | 10/2000 | Roy et al. | |
| 7,107,439 | B2 | * | 9/2006 | Risucci | 712/244 |
| 7,587,583 | B2 | | 9/2009 | Chauvel | |
| 7,617,388 | B2 | | 11/2009 | Kissell | |
| 7,865,698 | B1 | | 1/2011 | Purcell et al. | |
| 2001/0010072 | A1 | * | 7/2001 | Yoshida | 712/209 |
| 2001/0039621 | A1 | * | 11/2001 | Yamamoto et al. | 713/194 |
| 2002/0069402 | A1 | * | 6/2002 | Nevill et al. | 717/139 |
| 2002/0083302 | A1 | * | 6/2002 | Nevill et al. | 712/209 |

* cited by examiner

*Primary Examiner* — Aimee Li
(74) *Attorney, Agent, or Firm* — Rory D. Rankin; Meyertons, Hood, Kivlin, Kowert & Goetzel, P.C.

(57) ABSTRACT

Systems and methods for efficient instruction support of an multiple features for opcodes of an instruction set. A processor detects a fetched instruction of a computer program comprises an opcode corresponding to a plurality of functions. Each function corresponds to a different type of operation. The processor determines the received instruction corresponds to a feature requested by the computer program, such as a cryptographic algorithm. A determination is made as to whether hardware support exists for the feature. If hardware support exists for the feature, the instruction is executed on-chip by the hardware. Otherwise, software performs the operation corresponding to the instruction.

20 Claims, 3 Drawing Sheets

METHODS AND MECHANISMS TO SUPPORT MULTIPLE FEATURES FOR A NUMBER OF OPCODES

BACKGROUND OF THE INVENTION

1. Field of the Invention

This invention relates to computing systems, and more particularly, to efficient instruction support of an increasing number of available features for an instruction set.

2. Description of the Relevant Art

Typically, instruction sets tend to have a limited opcode space. However, processors are continually introducing a wide variety of multi-function instructions, which are consuming available opcodes, in order to ensure performance leadership in key application spaces. Future processors may easily reduce the complexity and performance of the hardware associated with newer instructions, or deprecate older, less utilized instructions, by using a trap-and-emulate mechanism. However, the opcodes themselves cannot be reused for other purposes for a very long period of time, such as multiple processor generations. Also, the new features of interest supported by the multi-function instructions can be very application-space dependent. For example, new features and the corresponding multi-function instructions in the telecommunication space may be completely unused in the enterprise space. Therefore, the consumption of limited available opcodes may not be efficient.

In addition, although some multi-function instructions may remain useful for a significant period of time, other multi-function instructions may be associated with features that soon become outdated. One example is instructions that target cryptographic acceleration. In this space, ciphers age. Once important cipher algorithms rapidly lose importance as newer, stronger, and more efficient ciphers are invented and standardized. As a result, a processor, which supports instructions targeted at cryptographic ciphers, has an opcode space that will, over time, become littered with old out-of-date opcodes supporting out-of-date ciphers. Therefore, newer generations of instruction sets may have less opcode space for implementing newer features.

While increasing the instruction size, such as increasing from a 32-bit instruction size to a 64-bit instruction size, may resolve these problems, this solution is a very intrusive modification for customers to make. In addition, given the size of all instructions potentially increase, an application's instruction footprint becomes much larger. This overall size increase has a detrimental performance impact, especially in high multi-threaded processors with limited cache size.

Accordingly, increasing an instruction size is not a flexible scheme allows processors to introduce instruction-based support for features that are of only transient interest and then rapidly reuse the opcode space for newer instructions in a seamless manner.

In view of the above, efficient methods and mechanisms for efficient instruction support of an increasing number of available features for an instruction set are desired.

SUMMARY OF THE INVENTION

Systems and methods for efficient instruction support of an increasing number of available features for an instruction set are contemplated. In one embodiment, a processor comprises logic for detecting a fetched instruction of a computer program comprises an opcode corresponding to a plurality of functions. Each function corresponds to a different type of operation such as a complex arithmetic operation, a memory reference operation, or other. Conventional instructions comprise an opcode corresponding to a single function. The logic determines the received instruction corresponds to a feature requested by the computer program, such as a multi-media instruction set, a cryptographic algorithm, or other. A determination is made as to whether hardware support exists for the feature. If so, the instruction is executed on-chip by the hardware. Otherwise, software performs the operation corresponding to the instruction.

These and other embodiments will become apparent upon reference to the following description and accompanying drawings.

Figure 1:
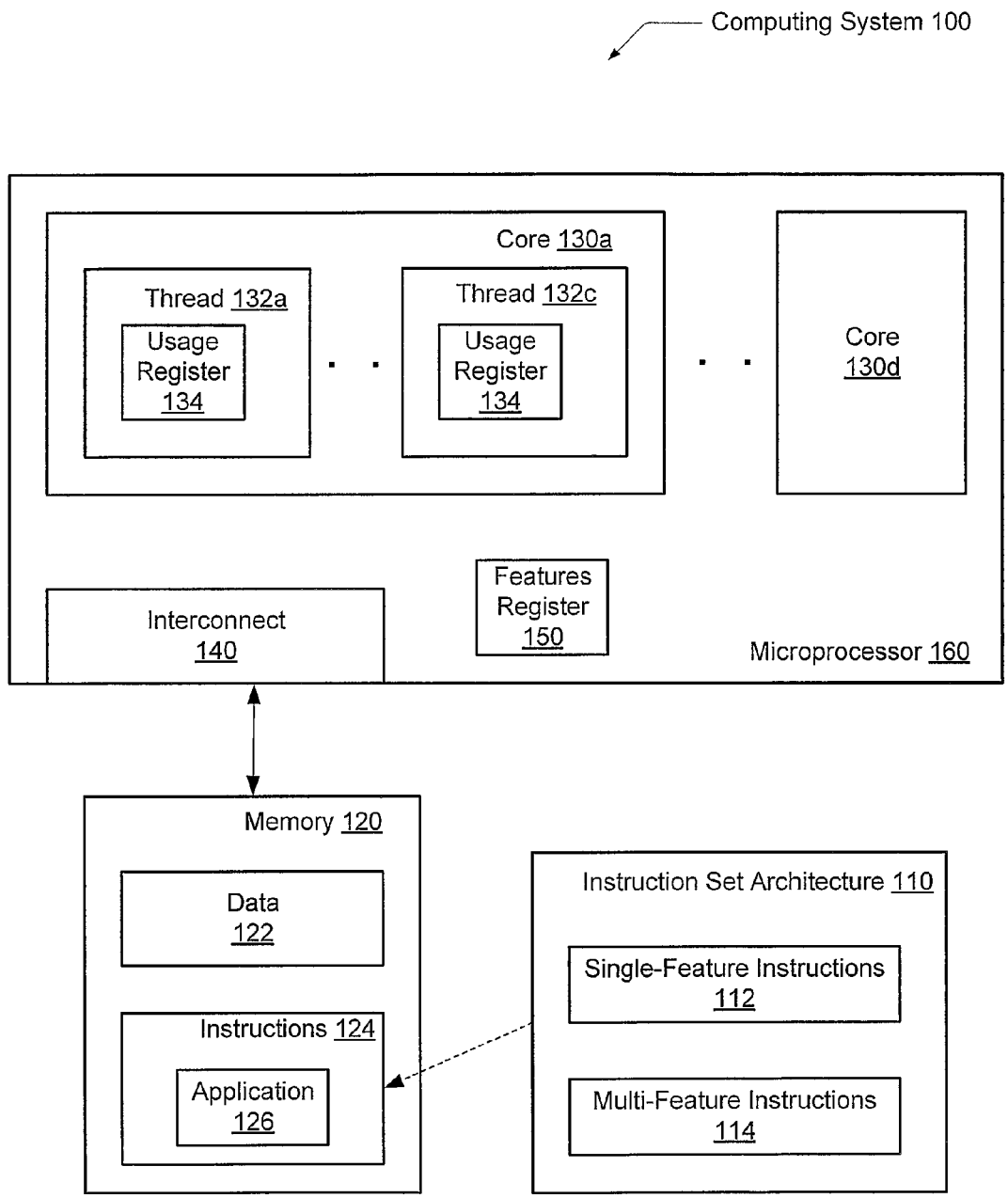
FIG. 1 is a generalized block diagram illustrating one embodiment of a computing system with a multi-threaded microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Referring to FIG. 1, one embodiment of a computing system 100 with a multi-threaded microprocessor 160 comprising multiple instantiated cores 130*a*-130*d* is shown. In one embodiment, microprocessor 160 may be a standalone processor within a mobile laptop system, a desktop, an entry-level server system, a mid-range workstation, or other. For such an embodiment, microprocessor 160 may internally utilize a system bus controller (not shown) for communication. A system bus controller may couple microprocessor 160 to outside memory 120 and input/output (I/O) devices such as computer peripherals, a graphics processing unit (GPU), or other. Alternatively, each of the cores 130*a*-130*d* and a system bus controller may be coupled to interconnect 140. Interconnect 140 may comprise memory controllers and interfaces to the memory controllers, to memory 120, and to a network that may connect computing system 100 to other computing systems. Interconnect 140 may include buses and control protocols to implement the interfaces.

In another embodiment, microprocessor 160 may be included in multiple processing nodes of a multi-socket system, wherein each node utilizes a packet-based link for inter-node communication. Therefore, a crossbar switch (not shown) may incorporate packet processing logic in addition to coupling processor cores 130a-130d to a cache memory subsystem not integrated within the cores. For example, one or more level three (L3) caches may reside outside cores 130a-130d, wherein a L1 cache and a L2 cache may be integrated within cores 130a-130d. Other cache memory hierarchies and placement are possible and contemplated.

As used herein, elements referred to by a reference numeral followed by a letter may be collectively referred to by the numeral alone. For example, processor cores 130a-130d may be collectively referred to as processor cores, or cores, 130. Each processor core 130 within microprocessor 160 may utilize conventional processor design techniques such as complex branch prediction schemes, out-of-order execution, a superscalar microarchitecture with a multi-stage pipeline, and register renaming techniques.

Each processor core 130 may support execution of multiple threads 132. Multiple instantiations of a same processor core 130 that is able to execute multiple threads may provide high throughput execution of server applications while maintaining power and area savings. Each core 130 may include circuitry for executing instructions according to a predefined instruction set 110. For example, the SPARC instruction set architecture (ISA) may be selected. Alternatively, the x86, x86-64, Alpha, PowerPC, MIPS, PA-RISC, or any other instruction set architecture may be selected.

In one embodiment, each core 130 performs pipelined out-of-order execution. An instruction fetch unit (IFU) fetches instructions from memory which may include a first-level instruction-cache (i-cache) and a corresponding instruction translation-lookaside-buffer (i-TLB). The instruction i-cache and i-TLB may store instructions and addresses respectively in order to access the instructions for a software application, or computer program. The IFU may include a program counter that holds a pointer to an address of a memory line containing the next instruction(s) to fetch for a particular thread from the i-cache. This address may be compared to addresses in the i-TLB. The IFU may also include a branch prediction unit to predict an outcome of a conditional instruction prior to an execution unit determining the actual outcome in a later pipeline stage.

A decoder unit, or decoder, decodes the opcodes of the one or more fetched instructions per clock cycle. The instructions arrive from the IFU. After decoding, both data and control signals for the instruction may be sent to a scheduler for instruction issue to a function unit in an execution unit.

These instructions may include flow control operations or functions such as conditional branch or jump operations, memory access operations such as load and store operations, data movement operations such as a register-to-register move, data rotate on a byte-by-byte basis, integer arithmetic operations, floating-point arithmetic operations, operations corresponding to a particular feature such as cryptographic algorithms, multi-media instruction sets, or other; set and reset of data fields, or other. It is apparent to one skilled in the art that the above instruction types, or functions, and formats are not all inclusive.

Generally, each thread 132 within each processor core 130 may access a cache memory subsystem within a memory hierarchy for data 122 and instructions 124. For example, each core 130 may contain its own level 1 (L1) and level 2 (L2) caches in order to reduce memory latency. These cache memories may be integrated within respective processor cores 130. Alternatively, these cache memories may be coupled to processor cores 130 in a backside cache configuration or an inline configuration, as desired. The L1 cache may be located nearer a processor core 130 both physically and within the cache memory hierarchy.

In one embodiment, a decode unit within each thread 132 within each processor core 130 may include a usage register 134 for storing indications of requested features by a software application. Alternatively, a decode unit may be shared across all threads 132 within a core 130 and this shared decode unit may access corresponding usage registers 134 on a thread basis. In yet another embodiment, the usage registers 134 may be located with other configuration and status registers outside of a decode unit but are coupled to logic, such as a decode unit. A features register 150 may reside outside of cores 130 within microprocessor 160 and is initialized upon a boot-up or reset process. Features register 150 may have a copy of itself within each core 130 and each copy receives the contents of the features register 150 during boot-up or reset in a serial fashion such as by a linear shift register. Features registers 150 may store indications of features with hardware support within microprocessor 160. Each usage register 134 and the features register 150 will be further described shortly.

In one embodiment, memory 120 may be lower-level memory such as a hard disk. In another embodiment, memory 120 comprises a hierarchy with faster and smaller memory such as caches at the top of the hierarchy and slower and larger memory such as a hard disk at the bottom of the hierarchy. In one embodiment, intermediate stages of the hierarchy comprises dynamic random access memory (DRAM), dual in-line memory modules (dimms), double data rate dual in-line memory modules (DDR DIMM), or other to store copies or updated values of both data 122 and instructions 124.

The software application 126 may be stored with other applications in memory 120. Also, memory 120 may store data 122 used during the execution of applications 126. The ISA 110 may include both single-function instructions 112 and multi-function instructions 114. The difference between these instruction types will be described shortly below. Both single-function instructions 112 and multi-function instructions 114 may be used to form a software application 126 to perform useful work.

Both single-function instructions 112 and multi-function instructions 114 may comprise both preexisting and new instructions for a particular microprocessor 160. As used herein, the term "function" may refer to an operation or instruction type associated with a particular opcode. For example, a function may be an integer arithmetic operation, a floating-point arithmetic operation, a memory reference operation such as a load or a store operation, a control flow operation (branch, jump), a complex arithmetic operation (multiply and accumulate), a multi-media operation, a cipher instruction associated with a particular cryptographic algorithm, or other. Modern conventional instructions are typically single-function instructions.

In one embodiment, the multi-function instructions 114 may include instructions for new features, wherein it is desired to reuse the corresponding opcode. As used herein, the term "feature" refers to an attribute or innovation utilized by a computer program, wherein the software desires hardware acceleration of certain functions used by the feature. The new features may include multi-media instruction sets, cryptographic algorithms, or other. It may or may not be known that the new features will have a longstanding existence requiring software and/or hardware support before being replaced with other subsequent features. Regardless, there may be a limit to the addition of new instructions due to a limited opcode space.

In one embodiment, new instructions may include an encoding, such as an additional new opcode, to expand the number of instructions in the ISA without changing the decode of preexisting instructions. In another embodiment, the new instructions may reuse opcodes of the preexisting instructions, which does change the decode of instructions with these particular opcodes. Software applications 126 executing on microprocessor 160 may provide information to the hardware regarding the type of operation or function that is expected to be performed when a particular opcode is executed. When the hardware executes one of these particular opcodes, it is then possible for the hardware to ensure that the operation or function that will be performed matches the expectation of the software application. In the case of a mismatch, the hardware may generate a trap, which allows the software to take corrective action.

Figure 2:
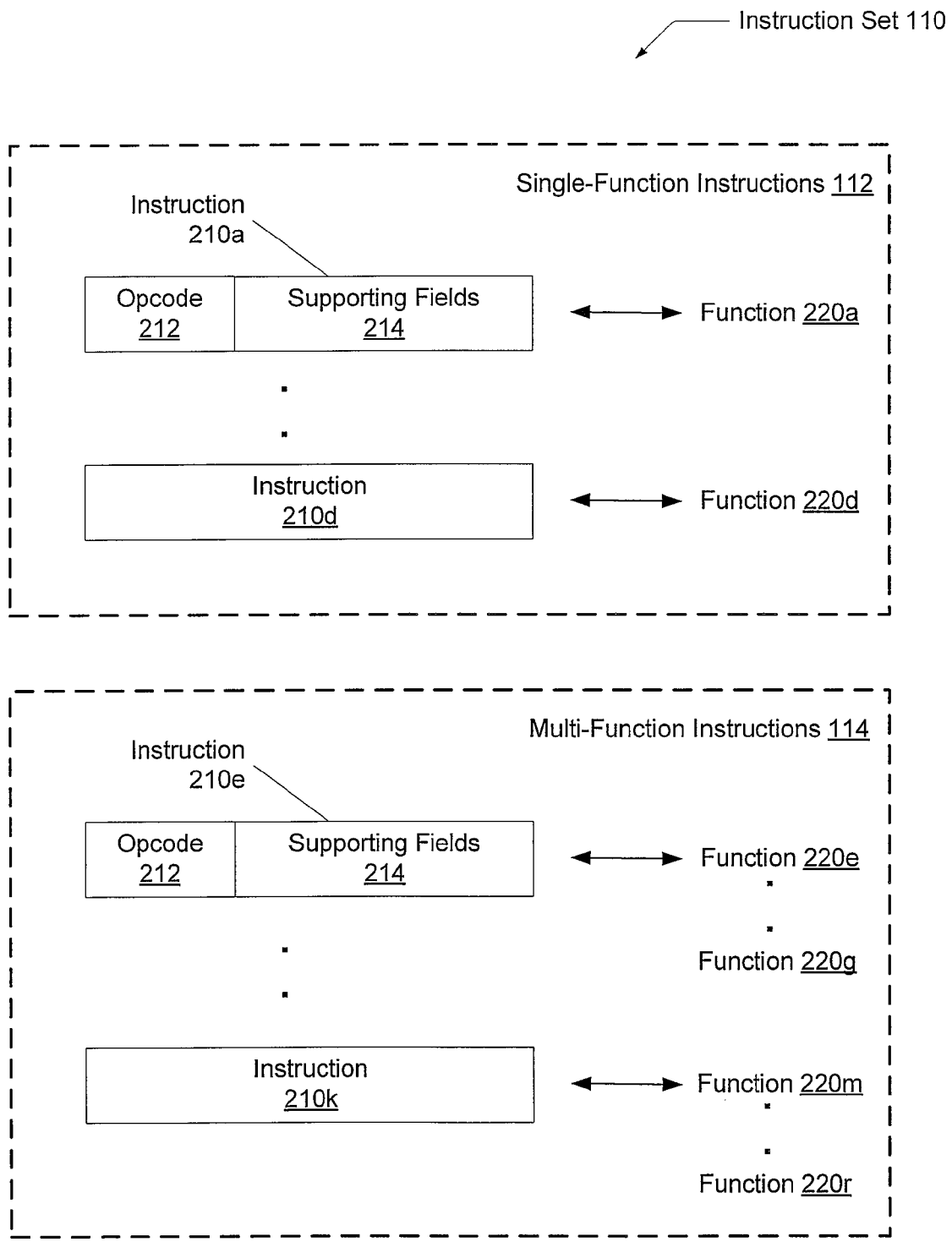
FIG. 2 is a generalized block diagram illustrating one embodiment of an instruction set.

Referring now to FIG. 2, one embodiment of an instruction set 110 is shown. An instruction 210 typically comprises an opcode 212 and one or more supporting fields 214. For purposes of discussion, the opcode 212 and fields 214 are shown in a particular order. However, in various embodiments, these entities may be arranged in any order, may not be contiguous, and the opcode 212 and fields 214 may either exist in a particular unit size such as a byte or they may have varying sizes that are not in units of bytes. As shown, an instruction 210a includes an opcode 212 that may be determined by decode logic to indicate a single-function instruction 112. Such a single-function instruction may be associated with a single arithmetic operation or function 220a. The supporting fields 214 may comprise one or more source register operands, an immediate field, a destination register operand, or a combination thereof.

Alternatively, single-function instruction 210a may be associated with a single feature 220a such as a store memory reference operation. Supporting fields 214 may comprise one or more source register operands and an offset value. In this case, single feature 220a is a store memory reference function. Each instruction 210 within single-function instructions 112 has a single associated feature 220, operation, or function corresponding to an opcode 212.

Taking cryptography as an example of new features, a cipher is a series of well-defined steps, or an algorithm, for performing encryption and decryption operations for secure transport of information. In one embodiment, the encrypting procedure may be varied based on a key, which may be a 128 bit value used during both the encryption and decryption steps. A key may need to be selected before using a cipher to encrypt a message. Without knowledge of the key, it may be difficult, if not nearly impossible, to decrypt the resulting cipher into readable plain text. Block ciphers work on blocks of symbols or data usually of a fixed size, and stream ciphers work on a continuous stream of symbols or data. Some examples of ciphers, or new features, include Advanced Encryption Standard (AES), Secure Hash Algorithm 1 (SHA1), Rivest, Shamir, and Adleman (RSA); Rivest Cipher 4 (RC4); Message Digest algorithm 5 (MD5); Kasumi; Elliptic Curve Cryptosystem (ECC) algorithm; Data Encryption Standard (DES), and Triple DES (3DES).

Software or off-chip hardware cards originally executed cipher operations. However, security came at a price as system performance was reduced. Later, on-chip hardware accelerators were utilized to execute cipher operations. Integrated cryptographic acceleration enables applications to run securely without an extra cost of a separate cryptographic processor. In one embodiment, each processor core 130 of microprocessor 160 may include both a floating-point unit (FPU) and a cryptographic processing unit separate from an integer execution unit, wherein the cryptographic processing unit provides on-chip cryptographic acceleration. Such a unit may include a modular arithmetic unit (MAU) and a cipher/hash unit (CHU), which facilitates high-speed encryption and decryption by executing in parallel with other processor functions. These cryptographic functions are used in commercial and financial applications.

Consider an example wherein a new microprocessor is introduced that supports an opcode 212 for a cipher algorithm such as RC4. This opcode 212 and corresponding instruction 210d, for example, is associated with a single feature 220d which is a function to be performed in a hardware accelerator associated with the RC4 algorithm. A derivative or next-generation microprocessor may have a different set of relevant ciphers associated with it. For example, the cipher Kasumi, rather than RC4, may be supported by this new microprocessor. Typically, it would be necessary to utilize additional opcodes to achieve the necessary support for a new feature, or cipher in this case. However, it may be possible to support a new feature or features, such as operations associated with the Kasumi cipher, with an opcode associated with an older feature, such as the RC4 cipher, predicted to be utilized infrequently in the future. Therefore, instruction 210d may be moved to become instruction 210e, wherein this opcode 212 of instruction 210e supports at least two features rather than a single feature. Instructions 210e-210k of multi-function instructions 114 may each support two or more features. For example, an instruction 210e may support features 220e-220g and instruction 210k may support functions 220m-220r.

Before continuing with a method for efficient reuse of opcodes, a general overview of the desired operations to be performed by a method 300 are provided here. In one embodiment, microprocessor 160 may comprise hardware support for three separate cipher algorithms. For example, an opcode A may correspond to RC4, an opcode B may correspond to 3DES, and an opcode C may correspond to MD5. For this example, within features register 150, bit 0 may correspond to RC4, bit 1 may correspond to 3DES, and bit 2 may correspond to MD5.

A next-generation microprocessor may utilize additional opcodes for newly supported algorithms such as an opcode D corresponding to Kasumi and opcode E corresponding to SHA-1. Opcodes A-C would still be consumed in future microprocessors, although there may be no interest in the cryptographic features RC4, 3DES and MD5 algorithms.

Within the features register 150 and a corresponding usage register 134 for a particular software application, each bit may be designated to represent a different algorithm. For instance, bit 0 corresponds to RC4, bit 4 corresponds to SHA-1, and so forth. The mapping in the features register 150 and the usage register 134 may be identical and may be fixed across future and derivative microprocessors.

When an application wishes to perform a RC4 operation, the application will set the corresponding bit in the usage register 134 that corresponds to RC4 (i.e. bit 0). Prior to the setting of the usage register 134 by the software application, the features register 150 may have been set by hardware during a boot-up or reset process. Subsequent the setting of the usage register 134, the hardware in the microprocessor may decode opcode A. Before the hardware in the microprocessor attempts to complete decoding and begin execution of opcode A, the hardware will compare the contents of bit 0 for both the features register 150 and the usage register 134. If a match is determined, then the hardware may complete decoding of opcode A and subsequently perform the requested RC4 operation. Accordingly, on the first-generation microprocessor, an application is free to perform RC4 operations using opcode A. Similar enforcement is applied to opcode B and opcode C for 3DES and MD5, respectively.

If the application is moved to future or derivative microprocessor hardware, which reuses opcode A to provide support for the cipher algorithm Kasumi, then the features register 150 and the corresponding usage register 134 will generate a mismatch, since the features register 150 now will have a reset value denoting no hardware support for the RC4 cipher algorithm. The microprocessor hardware will trap and allow the software to emulate any RC4 operations requested by the application. Accordingly, old software applications will continue to work correctly on future or derivative microprocessors, although the opcode, such as opcode A in this example, has been reassigned.

For software applications that require Kasumi operations, these applications will set bit 3 in a corresponding usage register 134. When these applications are running on future or derivative microprocessor hardware, which has reused opcode A to provide support for Kasumi, the features register 150 and the usage register 134 will match and the hardware will perform the requested Kasumi operation.

As a result, the hardware may reuse a limited set of opcodes to perform a variety of different operations. Applications will continue to experience expected results on all of these platforms. As a performance optimization, software applications may inspect the settings of the features register 150 prior to execution of the body of code to ensure that the microprocessor hardware provides support for the required operations. This upfront verification may be more efficient than checking register contents for matched values each time the limited set of opcodes is encountered during execution.

In addition, branching to a body of code upfront may be more efficient than the trap-and-emulate mechanism for each encounter of a reused opcode. For instance, if an application that requires RC4 checks the features register 150 of a derivative microprocessor that uses the same opcode for Kasumi, then the application will find the RC4 bit in the features register 150 unset. This unset bit indicates that this version of the hardware does not provide hardware support for RC4. The application can utilize standard instructions to perform the RC4 operation, rather than utilize the trap-and-emulate support.

Figure 3:
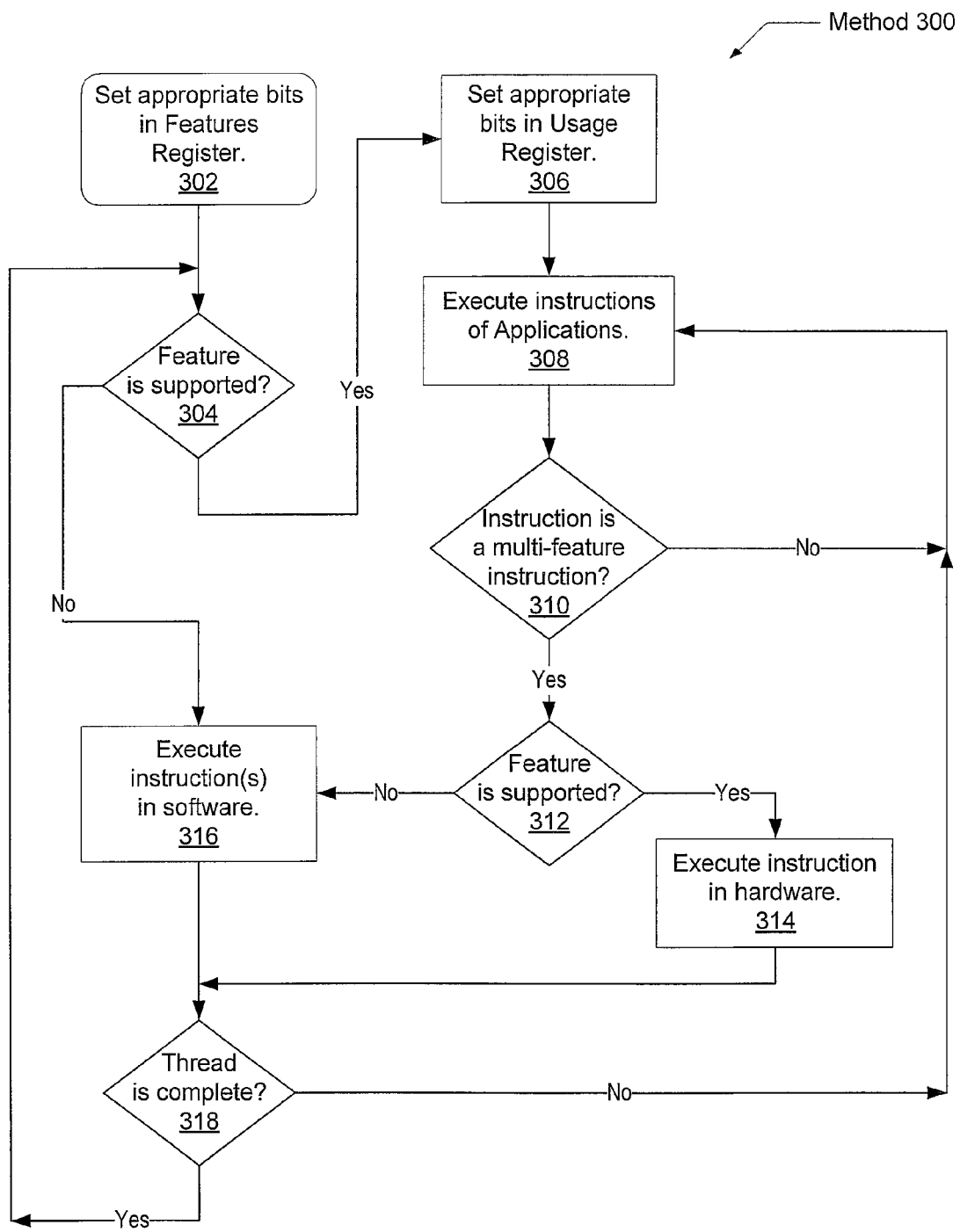
FIG. 3 is a generalized flow diagram illustrating one embodiment of a method for efficient instruction support of an increasing number of available features for an instruction set.

Turning now to FIG. 3, one embodiment of a method 300 for efficient instruction support of an increasing number of available features for an instruction set is illustrated. The components embodied in the computer system described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In one embodiment, an instruction features register 150 is placed in microprocessor 160 in order to provide a low-cost support for an increasing number of available features for microprocessor 160. In one embodiment, a single features register 150 may exist for all of the different classes of features, such as multi-media functions, cryptographic functions, or other. In another embodiment, a separate features register 150 may exist for each class of features. The features register 150 provides a mapping of a hardware-supported feature to an opcode of the set of opcodes associated with multi-function instructions 114.

In one embodiment, the features register 150 may be read by non-privileged applications. However, the features register 150 may only be written by a hypervisor. A hypervisor is a software layer that runs directly on the hardware without the need of a host operating system (OS).

Generally speaking, multiprocessing is one technique that enables several software applications to share a multi-core processor or even a multi-threaded core. With these techniques a general-purpose operating system (OS) has control of a system's physical resources, such as allocation of the physical resources and management of external storage. Virtualization is a further technique that supports the illusion that each software application controls all physical resources, or even more resources than are physically available. This method creates an illusion for an OS within each VM that the OS has full access to the physical resources that have been made visible. Such an approach allows for time-sharing a single computer between several single-tasking OSes.

Virtualization has proved to be a powerful technology to simplify software development and testing, to enable server consolidation, and to enhance application space agility. Virtualization broadly describes the separation of a service request from the underlying physical delivery of that service. The software layer that runs directly on the hardware without the need of a host OS, or the hypervisor, may need hardware assistance. Privileged and sensitive calls within a corresponding OS may be set to automatically trap to the hypervisor, removing a requirement for binary translation.

In one embodiment, during a boot-up or reset process of microprocessor 160, the features register 150 resets all bits to a logic low value, or disables all representative features. Then the hypervisor may write the features register 150 and set appropriate bits in block 302 of method 300. This step may need to be done before any instructions corresponding to the representative features are executed. Export control restrictions may be enforced by the hypervisor. In one embodiment, a 64-bit cryptographic features register (CFR) 150 may have the following mapping: CFR[63:8]==0 and CFR[7:0] =={SHA512, SHA256, SHA1, MD5, Camellia, Kasumi, DES, AES}. If the hypervisor attempts to set an unsupported bit, such as bits 63 to 8, then a corresponding trap occurs and the features register 150 will be unchanged.

In another embodiment, there may be a set of fuses on-chip, wherein each fuse corresponds to a separate bit of the features register 150. During manufacturing, one or more of the fuses may be blown in order to disable the corresponding features. In such a case, a logic low value may be written into a corresponding register of the features register 150. During a boot-up or reset process, a binary value corresponding to a blown (logic low) state or an unblown (logic high) state of a fuse is loaded into a corresponding register of the features register 150 in block 302 of method 300. Again, if the hypervisor attempts to set an unsupported bit, then a corresponding trap occurs and the features register 150 will be unchanged. Export control can be enforced at manufacturing time or by the hypervisor.

In one embodiment, a verification procedure of a software application may be performed to verify that the features register 150 indicates hardware support for a desired feature, such as a RC4 algorithm. If the features register 150 indicates no hardware support (conditional block 304), then in block 316, the application may branch to a predetermined location and utilize standard instructions to perform the unsupported features, such as the RC4 algorithm. Once the corresponding thread completes execution (conditional block 318), control flow of method 300 returns to conditional block 304 for a new software application. The corresponding usage register 134 may have all of its stored bits reset to initial values.

If the features register 150 indicates hardware support (conditional block 304), then in block 306, the appropriate bits within a corresponding usage register 134 of a particular thread are set. The usage register 134 defines which features have been enabled for a particular process. Similar to the features register 150, a single usage register 134 may exist for all of the different classes of features, such as multi-media functions, cryptographic functions, or other. In another embodiment, a separate usage register 134 may exist for each class of features. The usage register 134 provides a mapping of a software-requested feature to an opcode of the group of opcodes associated with multi-function instructions 114.

The set, or enabled, values of a usage register 134 may always be a subset of the features register 150. In one embodiment, a usage register 134 has the same mapping as the features register 150. Therefore, a 64-bit cryptographic usage register 134 may have the following mapping: CUR[63:8]==0 and CUR[7:0]=={SHA512, SHA256, SHA1, MD5, Camellia, Kasumi, DES, AES}. If a write operation to the usage register 134 attempts to modify a bit outside of the available features range, such as bits 63 to 8, then a corresponding trap occurs and the usage register 134 will be unchanged. The usage register 134 may be unprivileged, and therefore, it may be written and read by user code.

It is noted, in one embodiment, for a second-generation microprocessor 160, bits 11 to 8, for example, of the features register 150 and each usage register 134 may be enabled, which signifies new features are supported by the second-generation microprocessor. In addition, bits 3 to 0 of the features register 150 and each usage register 134 may be disabled, which signifies the corresponding opcodes are not to be reused on the second-generation microprocessor. Then hardware on the second-generation microprocessor may allow modification of any bits within the 11:0 range, although the bit range 3:0 is disabled. A subsequent opcode check may address this situation. Opcode reuse should not allow setting of reclaimed bits. Hardware logic may be configured to prevent the bit range 3:0 from being set in the features register 150 and/or in each usage register 134. When an unsupported opcode is in a pipeline of a corresponding core 130, hardware may check the corresponding bits in the features register 150 and the corresponding usage register 134. If either of the corresponding bits are reset, then a corresponding trap may be signaled for the corresponding instruction.

Once the corresponding usage register 134 is properly set, the body of code of the corresponding thread may execute in block 308. In one embodiment, a software application may comprise the following general code:

| | | |
|---|---|---|
| LOAD R1, FR | # Line 1: Read the contents of the features # register. | |
| AND R1, R1, 0x1 | # Line 2: Verify the desired algorithm # (AES associated with bit 0) is # hardware-supported. | |
| BRZ R1, label | # Line 3: If not hardware-supported, then # branch to software emulation code # located at label. | |
| LOAD R1, UR | # Line 4: Read the contents of the usage # register. | |
| OR R1, R1, 0x01 | # Line 5: Set desired feature (AES algorithm # associated with bit 0. | |
| STORE UR, R1 | # Line 6: Write the contents of the usage # register. | |
| NOP | # Line 7: Execute threads using AES. # Using nop as a place holder for real code. | |
| LOAD R1, UR | # Line 8: Read the contents of the usage # register upon completion of the # application. | |
| AND R1, R1, 0xffe | # Line 9: Clear used algorithm (AES, bit 0). | |
| STORE UR, R1 | # Line 10: Write the usage register. | |

Lines 1-2 correspond to conditional block 304. Line 3 corresponds to block 316. Lines 4-6 correspond to block 306 and line 7 corresponds to block 308. As the instructions of the main body of code of a thread execute, if a multi-function instruction 114 is detected, such as by decode logic (conditional block 310), then a corresponding bit within the usage register 134 determines if a corresponding feature is supported (conditional block 312). Since a check regarding the features register 150 was performed in conditional block 304, it may be unnecessary to compare corresponding bits within the features register 150 and the usage register 134. If a check was not performed in conditional block 304, then it may be necessary to compare corresponding bits within the features register 150 and the usage register 134.

If the feature is supported (conditional block 312), then the microprocessor hardware performs the required operation (block 314). If the feature is not supported, then a trap occurs and the required operation is performed by emulation in block 316.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
an instruction fetch unit configured to fetch instructions of a computer program;
a decoder coupled to receive instructions fetched by the fetch unit;
an execution unit coupled to the decoder; and
a features register, wherein said features register provides one or more indications of hardware supported features of the processor;
a usage register associated with a thread of execution, wherein said usage register provides one or more indications of particular features requested by the computer program;
wherein the decoder is configured to:
detect a received instruction comprises an opcode corresponding to a plurality of different functions; and
access the usage register to determine the computer program expects a particular one of the plurality of functions to be performed when the opcode is executed;
access the features register to determine whether there is hardware support for the particular one of the plurality of functions;
wherein in response to determining the features register indicates that hardware support exists to perform said particular one of the plurality of functions responsive to execution of the opcode, the execution unit is configured to execute the received instruction in order to perform said particular one of the plurality of functions.

2. The processor as recited in claim 1, wherein said plurality of functions comprises at least two different functions.

3. The processor as recited in claim 2, wherein said plurality of functions corresponds to one or more features.

4. The processor as recited in claim 3, wherein said hardware supported features include at least one of the following: a cryptographic cipher algorithm and a multi-media function.

5. The processor as recited in claim 1, wherein the processor is configured to compare one or more bits of the features register to one or more bits of the usage register to determine whether a feature requested by the computer program is supported in hardware by the processor.

6. The processor as recited in claim 5, wherein each of the features register and the usage register uses a single bit to identify a given feature.

7. The processor as recited in claim 6, wherein in order to determine hardware support exists for said feature, the decoder is further configured to determine bits of the first and the second sets of configuration registers corresponding to said feature indicate an enabled value.

8. The system as recited in claim 1, wherein in response to determining hardware support does not exist to perform said particular one of the plurality of functions responsive to execution of the opcode, the execution unit is configured to generate a trap responsive to execution of the opcode.

9. A method comprising:
receiving instructions of a computer program from a memory;
providing in a features register one or more indications of hardware supported features of a processor;
providing in a usage register associated with a thread of execution one or more indications of particular features requested by the computer program;
detecting a received instruction of said instructions comprises an opcode corresponding to a plurality of different functions; and
accessing the usage register to determine the computer program expects a particular one of the plurality of functions to be performed when the opcode is executed;
accessing the features register to determine whether there is hardware support in the processor for the particular one of the plurality of functions;
wherein in response to determining the features register indicates that hardware support exists to perform said particular one of the plurality of functions responsive to execution of the opcode, executing the received instruction in an execution unit in order to perform said particular one of the plurality of functions.

10. The method as recited in claim 9, wherein said plurality of functions comprises at least two different functions.

11. The method as recited in claim 10, wherein said plurality of functions corresponds to one or more features.

12. The method as recited in claim 11, wherein said hardware supported features include at least one of the following: a cryptographic cipher algorithm and a multi-media function.

13. The method as recited in claim 11, wherein each of the features register and the usage register uses a single bit to identify a given feature.

14. The method as recited in claim 13, further comprising storing an indication that a particular feature is supported by hardware in a register of a second set of configuration registers corresponding to each of one or more cores.

15. The method as recited in claim 13, further comprising determining bits of the first and the second sets of configuration registers corresponding to said feature indicate an enabled value in order to determine hardware support exists for said feature.

16. The method as recited in claim 9, wherein in response to determining hardware support does not exist to perform said particular one of the plurality of functions responsive to execution of the opcode, the method further comprises the execution unit generating a trap responsive to execution of the opcode.

17. A decode unit comprising:
a first interface coupled to an instruction fetch unit configured to receive fetched instructions of a computer program;
a second interface coupled to an execution unit; and
control logic configured to:
access a features register of a processor, wherein said features register provides one or more indications of hardware supported features of the processor;
access a usage register associated with a thread of execution, wherein said usage register provides one or more indications of particular features requested by the computer program;
detect a received instruction comprises an opcode corresponding to a plurality of different functions;
access the usage register to determine the computer program expects a particular one of the plurality of functions to be performed when the opcode is executed; and
access the features register to determine whether there is hardware support for the particular one of the plurality of functions;
convey the received instruction to an execution unit for execution, in response to determining hardware support exists for said particular one of the plurality of functions.

18. The decode unit as recited in claim 17, wherein said plurality of functions comprises at least two different functions.

19. The decode unit as recited in claim 18, wherein said plurality of functions corresponds to one or more features.

20. The decode unit as recited in claim 19, wherein said hardware supported features include at least one of the following: a cryptographic cipher algorithm and a multi-media function.

* * * * *